US009341795B2

(12) United States Patent
Luo et al.

(10) Patent No.: US 9,341,795 B2
(45) Date of Patent: May 17, 2016

(54) ELECTRIC-PORT SFP PHOTOELECTRIC MODULE

(71) Applicant: WUHAN TELECOMMUNICATION DEVICES CO., LTD., Wuhan, Hubei (CN)

(72) Inventors: Yaoxin Luo, Wuhan (CN); Benqing Quan, Wuhan (CN); Beili Song, Wuhan (CN); Yun Zhou, Wuhan (CN); Chunyan Zhang, Wuhan (CN)

(73) Assignee: WUHAN TELECOMMUNICATION DEVICES CO., LTD., Wuhan (CN)

( * ) Notice: Subject to any disclaimer, the term of this patent is extended or adjusted under 35 U.S.C. 154(b) by 0 days.

(21) Appl. No.: 14/403,179

(22) PCT Filed: Feb. 20, 2013

(86) PCT No.: PCT/CN2013/071690
§ 371 (c)(1),
(2) Date: Nov. 22, 2014

(87) PCT Pub. No.: WO2014/089935
PCT Pub. Date: Jun. 19, 2014

(65) Prior Publication Data

US 2015/0277070 A1 Oct. 1, 2015

(30) Foreign Application Priority Data

Dec. 13, 2012 (CN) ...................... 2012 2 0687370 U

(51) Int. Cl.
*G02B 6/36* (2006.01)
*G02B 6/42* (2006.01)

(52) U.S. Cl.
CPC .............. *G02B 6/4284* (2013.01); *G02B 6/428* (2013.01); *G02B 6/4246* (2013.01); *G02B 6/4261* (2013.01)

(58) Field of Classification Search
CPC .. G02B 6/4256; G02B 6/4261; G02B 6/4284; G02B 6/4278; G02B 6/4292
USPC .............. 385/14, 53, 83, 88, 89, 92, 134, 139
See application file for complete search history.

(56) References Cited

U.S. PATENT DOCUMENTS 6,350,063 B1 * 2/2002 Gilliland .............. G02B 6/4201 385/139
6,974,265 B2 12/2005 Chiu et al.
2005/0282425 A1 * 12/2005 Lloyd .................. G02B 6/4277 439/372
2007/0173101 A1 * 7/2007 Togami ................ H01R 31/065 439/372
2012/0275784 A1 * 11/2012 Soto ................... H04B 10/2503 398/38

FOREIGN PATENT DOCUMENTS

CN 201397407 Y 2/2010
CN 201740891 U 2/2011
CN 102164074 A 8/2011
CN 202003063 U 10/2011

* cited by examiner

*Primary Examiner* — Kaveh C Kianni
*Assistant Examiner* — Hung Lam
(74) *Attorney, Agent, or Firm* — Maschoff Brennan

(57) ABSTRACT

An electric-port SFP photoelectric module includes a base, an outer cover, a PCB and an RJ45 connector. The base is a rectangular parallelepiped with an inner cavity. The PCB and the RJ45 connector are connected in a combined manner. A combined structure of the PCB and the RJ45 connector is arranged in the inner cavity of the base. The upper part of the base is fastened with the outer cover.

13 Claims, 13 Drawing Sheets

ELECTRIC-PORT SFP PHOTOELECTRIC MODULE

TECHNICAL FIELD

The present invention relates to an optical communication module, in particular to an electric-port SFP photoelectric module with an RJ (Registered Jack) 45 connector.

BACKGROUND OF THE INVENTION

As optical communication industry develops, demand for SFP (Small Form-factor Pluggables) products is increasing. An SFP-155E transceiver is commonly used in the prior art, which completely satisfies the MSA (MultiSource Agreement) protocol of the SFP industrial standards. The main field of application covers SDH (Synchronous Digital Hierarchy) add-drop multiplexer, optical edge device, MSPP (modular software programmable processor) and switching system.

However, in the prior art, this type of module generally adopts "male mold" tube housing structure. Due to limited inner space in the tube housing, the internal chip is under stress after mounting. Moreover, the structure is complex and inconvenient for assembly and detachment.

SUMMARY OF THE INVENTION

The purpose of the present invention is to provide a flexibly pluggable and detachable electric-port SFP photoelectric module that comes in simple structure, is easy to install, and can solve the problem of limited chip space.

To solve the above problem, the present invention provides an electric-port SFP photoelectric module, comprising a base, an outer cover, a PCB and an RJ45 connector. The base is a rectangular parallelepiped provided with an inner cavity. The PCB and the RJ45 connector are connected in a combined manner, and the combined structure of the PCB and the RJ45 connector is arranged in the inner cavity of the base, and the upper part of the base is fastened with the outer cover.

Further, the outer cover is an U-shaped cover, snap-in square holes are provided at the two sides of it; snap-in bosses for the outer cover are provided at the two sides of the base, and the said snap-in bosses for the outer cover is fastened with the snap-in square holes.

Further, a locator is also provided in the base, a locating notch matching with the locator is provided on the PCB, and the said locating notch is snapped onto the locator.

Further, a PCB limit piece is also provided on the side wall of the outer cover, which locates the PCB.

Further, a pull ring is also provided at one end of the base, which is connected to a brake piece and fastened to the end of the base.

Further, a pull ring snap ear is also provided at the other end of the base, and a pull ring pivot is provided at the bottom of the pull ring, which is snapped in the pull ring snap ear.

Further, a brake piece drive pin is provided at the bottom of the pull ring, a brake piece pull ear is provided at one end of the brake piece, and the said brake piece pull ear is snapped onto the brake piece drive pin.

Further, a snap-in cover is provided at the bottom of the said base, which presses the brake piece and is fastened to the bottom of the base.

Further, snap-in bosses for the snap-in cover are provided at the two sides of the base, and snap-in square holes are provided at the two sides of the snap-in cover, which are fastened with the snap-in bosses.

Further, a clip is provided at the bottom of the snap-in cover, which presses the brake piece.

With delicate construction design, the invention not only meets the size requirement, but also solves the problems of tight internal space of a tube housing, complicated mounting procedures of the tube housing and the like , and is convenient for assembly and can be flexibly detached.

In the course of production of the module, it only needs to mount the components of the PCB and RJ45 connector into the base, and place the brake piece and the pull ring into the pull ring snap ear of the base, and put on the outer cover and the snap-in cover, which reduces the steps of assembling clip and fastening screws of the prior art and improves the productivity.

In the figures,

1—PCB;

11—Connecting notch, 12—Locating notch, 13—Pin weld hole;

2—Outer cover;

21—Clip, 22—Snap-in square hole, 23—PCB limit piece;

3—RJ45 connector;

31—Locating boss;

4—Base;

41—Inner cavity, 42—RJ45 plug-in position, 43—Locking boss;

44—Pull ring snap ear, 45—Brake piece sliding chamber, 46—Stop salient point;

47—Locator, 48—Foolproof notch, 49—Snap-in boss for outer cover;

410—Snap-in boss for snap-in cover;

5—Pull ring;

51—Pull ring pivot, 52—Pull ring handle, 53—Stop salient point;

54—Brake piece drive pin;

6—Brake piece;

61—Locating notch, 62—Brake piece pull ear;

7—Snap-in cover;

71—Clip pressing the brake piece, 72—Pull ring stop piece, 73—Snap-in square hole of the snap-in cover.

DETAILED DESCRIPTION OF THE EMBODIMENTS

For ease of a further understanding of the present invention, detailed description will now be made below with reference to the accompanying drawings and embodiments, so that those skilled in the art can better understand and put it into implementation. However, the described embodiments are not intended to define the present invention.

Figure 1:
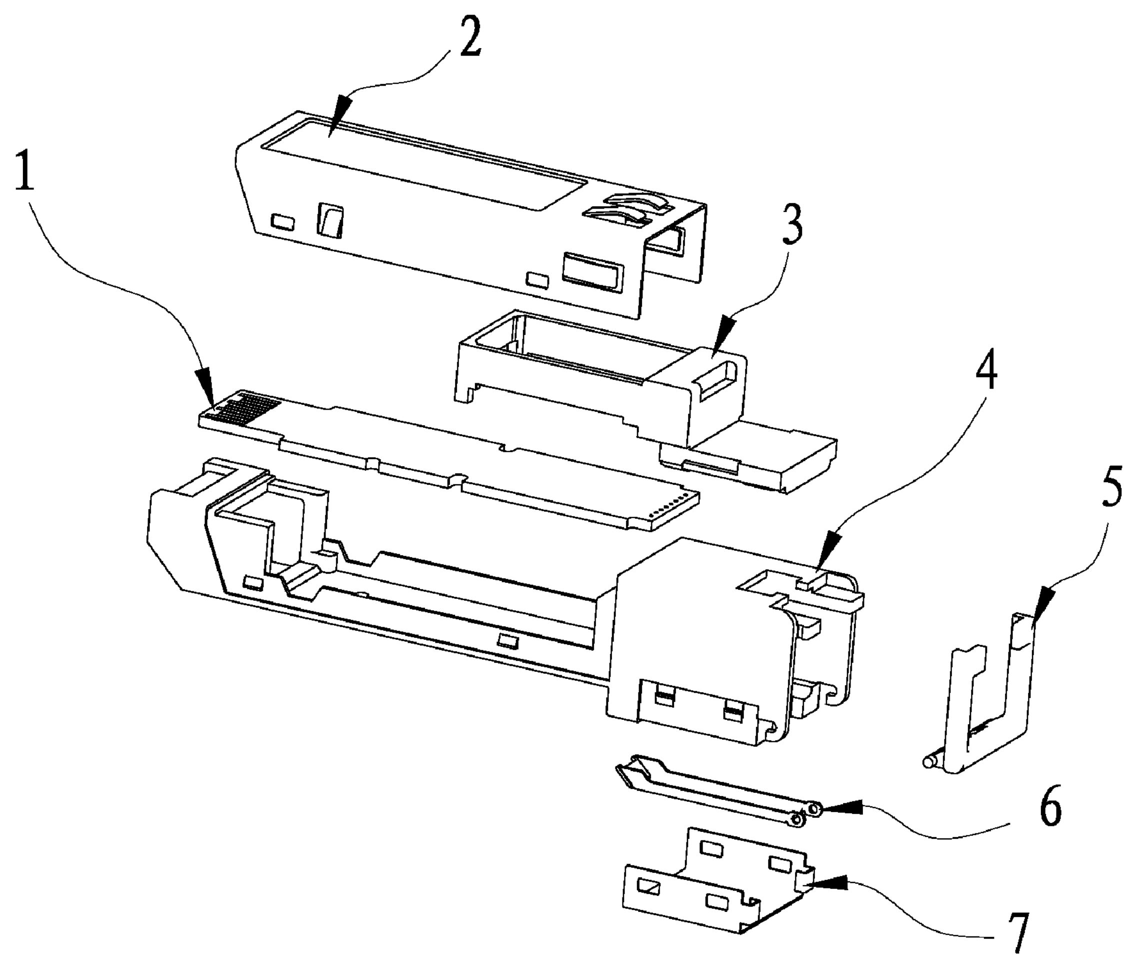
FIG. 1 is an explosion illustration of the electric-port SFP photoelectric module of the invention.
Figure 2:
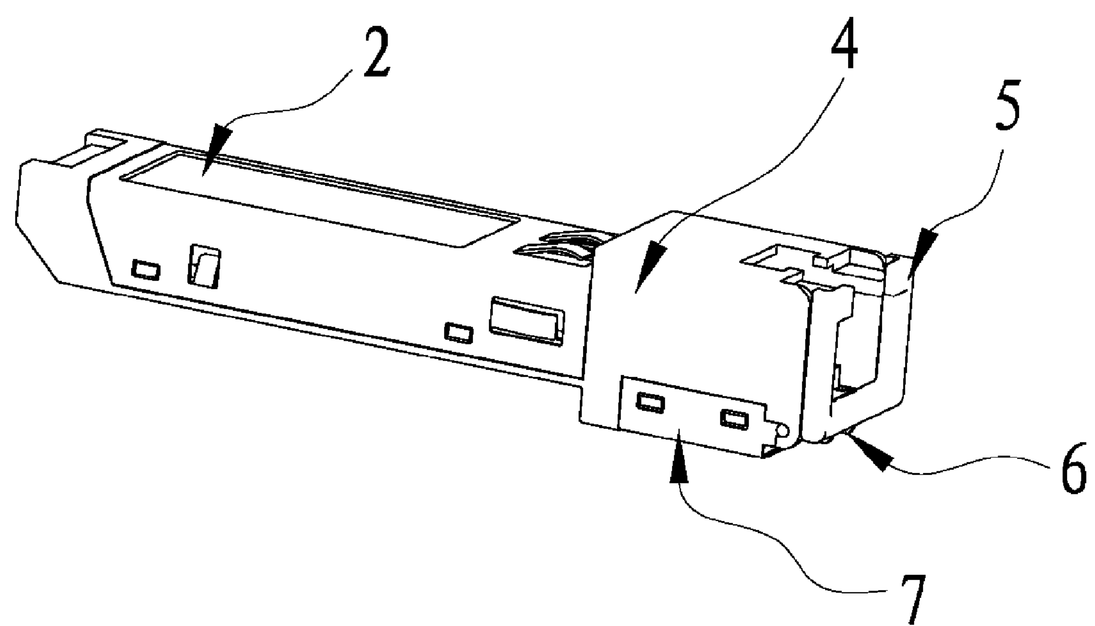
FIG. 2 is a constitutional diagram of the invention.
Figure 3:
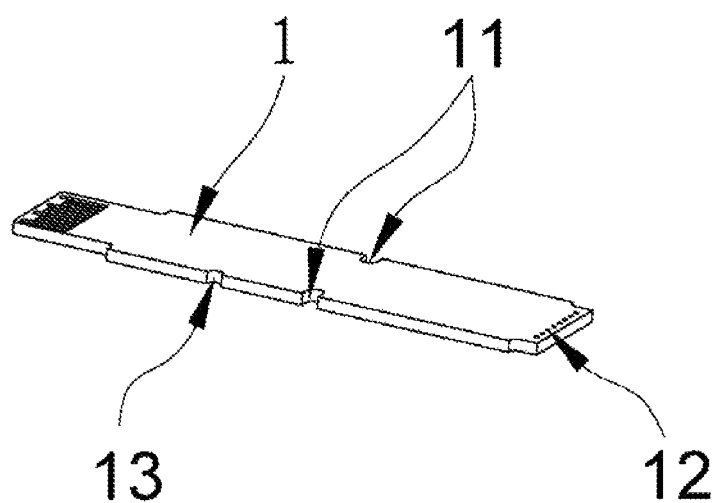
FIG. 3 is a structural illustration of the PCB of the invention.
Figure 5:
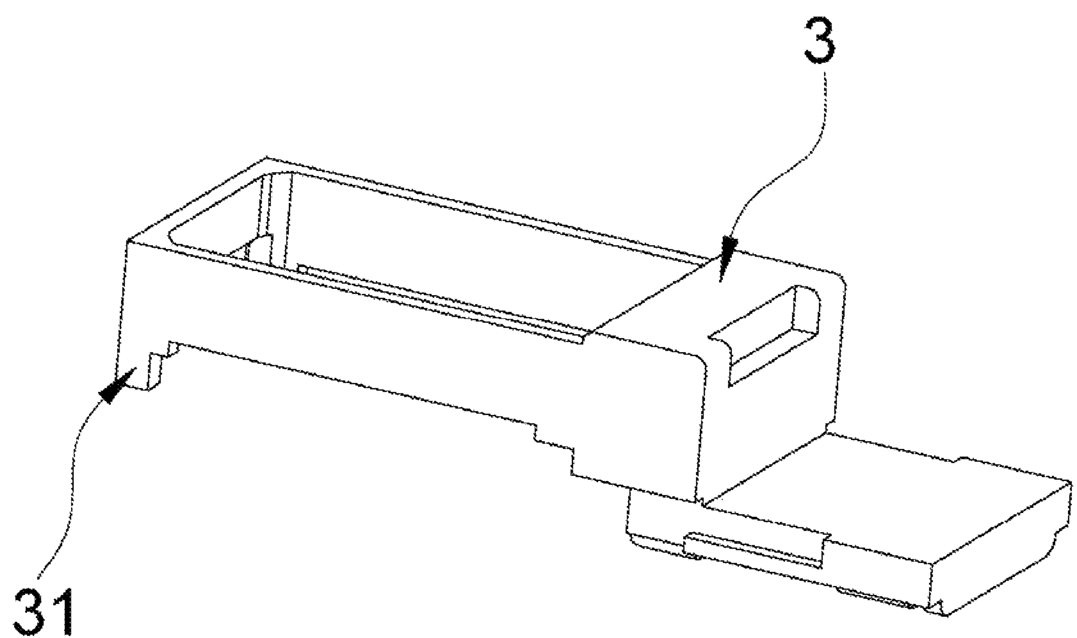
FIG. 5 is a skeleton diagram of the RJ45 connector of the invention.
Figure 6:
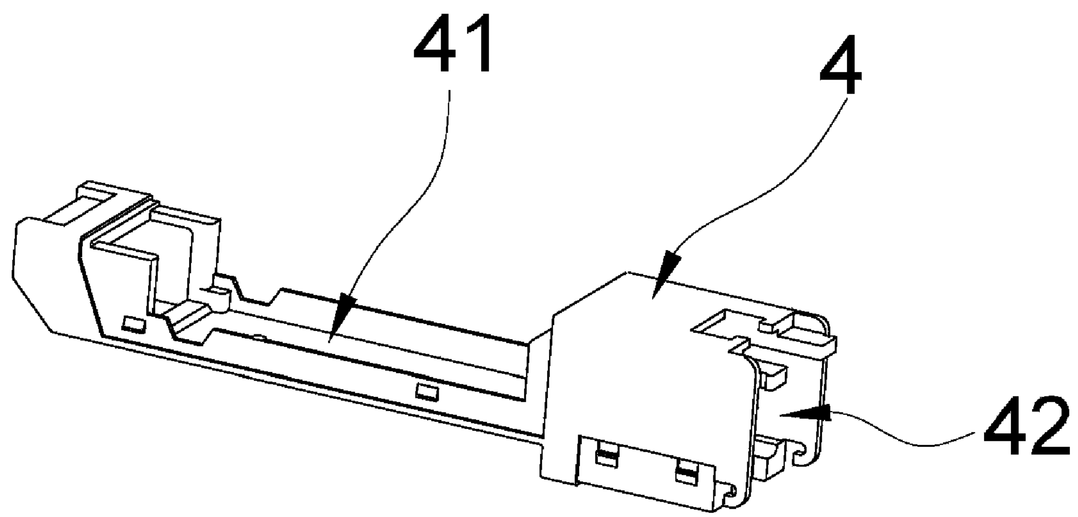
FIG. 6 is a skeleton diagram of the base of the invention.
Figure 7:
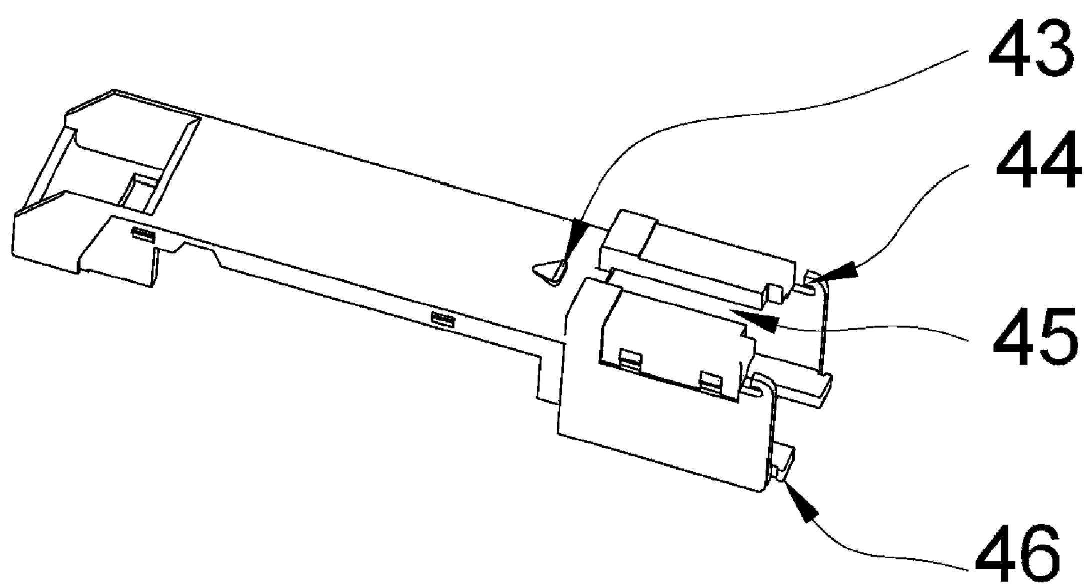
FIG. 7 is a bottom view of the base in FIG. 6.
Figure 8:
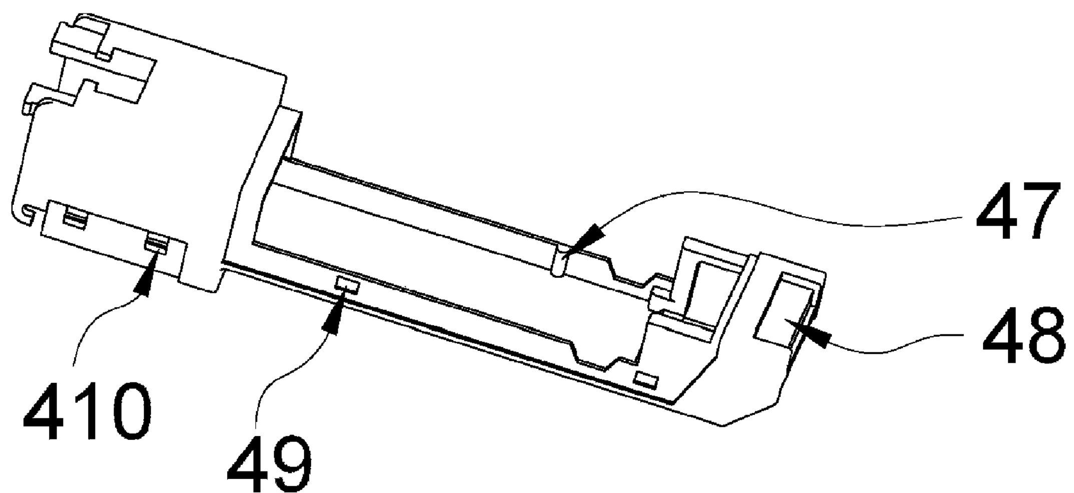
FIG. 8 is a back view of the base in FIG. 6.
Figure 9:
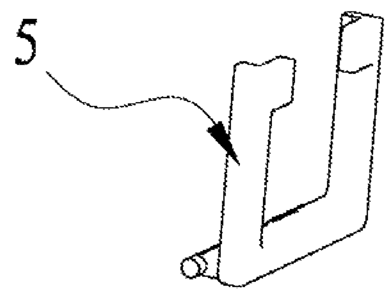
FIG. 9 is a skeleton diagram of the pull ring of the invention.
Figure 10:
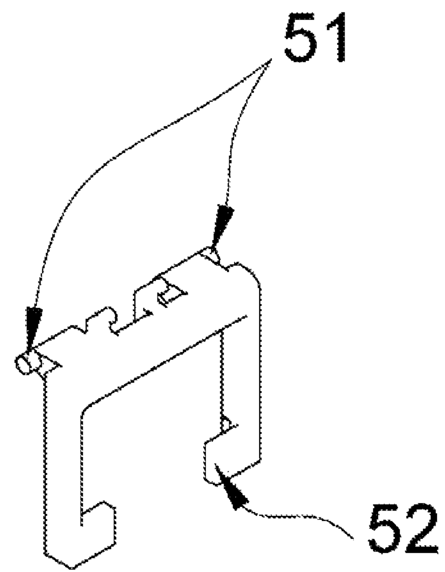
FIG. 10 is a bottom view of the pull ring in FIG. 9.
Figure 11:
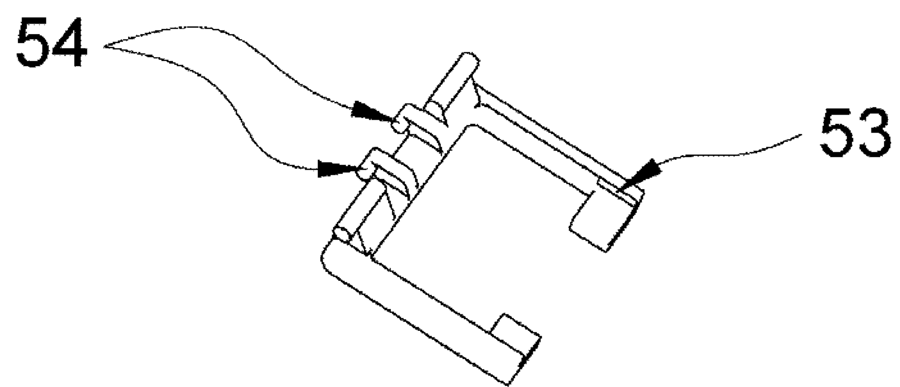
FIG. 11 is a left view of the pull ring in FIG. 9.
Figure 12:
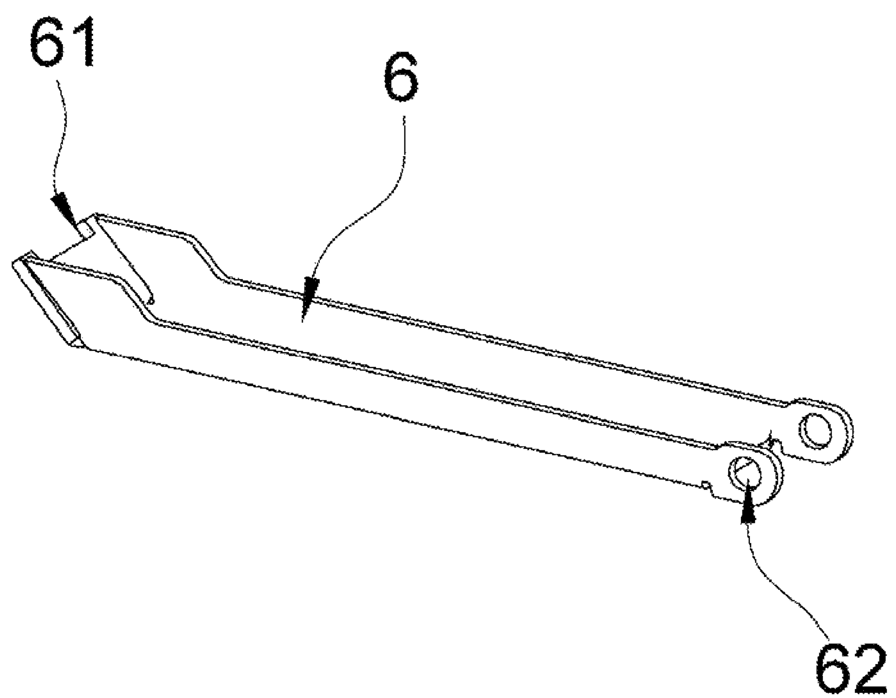
FIG. 12 is a skeleton diagram of the brake piece of the invention.

FIGS. 1, 2 and 3 respectively show the structural explosion illustration, the constitutional diagram and the PCB structural illustration of the embodiment of the electric-port SFP photoelectric module of the invention, comprising a base 4, an outer cover 2, a PCB1 and RJ45 connector 3. The base is a rectangular parallelepiped provided with an inner cavity. The PCB1 and the RJ45 connector 3 are connected in a combined manner, the connecting notch 11 of the PCB1 is snapped to the locating boss 31 (as shown in FIG. 5) of the RJ45 connector 3, and the pin weld hole 13 of the PCB1 is inserted into the RJ45 connector 3.

The combined structure of the PCB1 and the RJ45 connector 3 is arranged in the inner cavity of the base, an RJ45 plug-in position 42 is also arranged on the base 4, one end of the RJ45 connector 3 is plugged in the RJ45 plug-in position 42, and the upper part of the base 4 is fastened with the outer cover 2.

Figure 4:
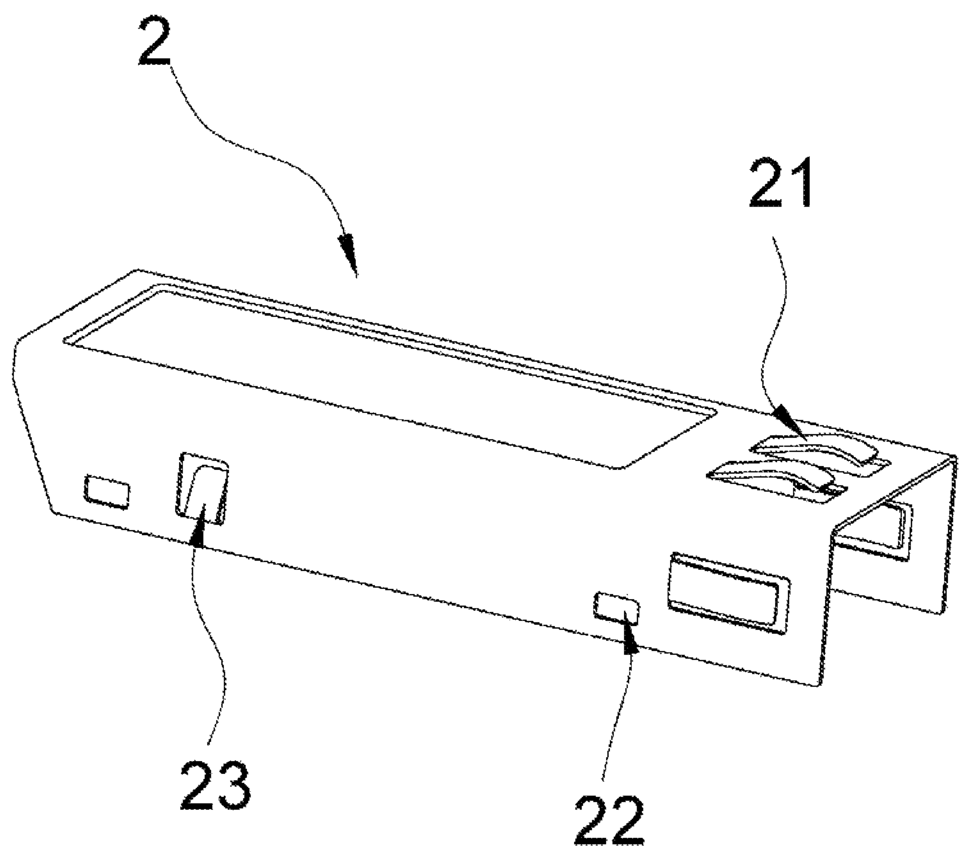
FIG. 4 is a skeleton diagram of the outer cover of the invention.

As shown in FIG. 4, in this example, the outer cover is a U-shaped cover made by bending stainless steel; totally four clips 21 are arranged at the two sides and the top of one end of the outer cover 2, and snap-in square holes 22 are provided at the two sides of the outer cover 2. For firm snap-in, the number of snap-in square holes 22 is preferably identified four; snap-in bosses 49 for the outer cover matching with the snap-in square holes 22 are provided at the two sides of the base, and the snap-in bosses 49 are fastened with the snap-in square holes 22 of the outer cover.

A locator 47 is also provided in the base 4, and a locating notch 12 matching with the locator 47 is provided on the PCB1. A PCB limit piece 23 is also provided on the side wall of the outer cover, which is to locate the PCB1. The position of PCB1 is fixed by the locator 47 and the PCB limit piece 23 to prevent PCB1 from deviation or falloff in application.

As shown in FIGS. 6-12, a pull ring 5 is also arranged at the bottom of the base 4, a foolproof notch 48 is provided at the other end of the base; the said foolproof notch 48 ensures correct plugging of the invention in application; a locking boss 43 is arranged at the bottom of the base 4 for lockup when the invention is plugged in application.

An optimum U-shaped brake piece 6 is connected to the pull ring 5 which is fastened to the end of the base 4. In the embodiment, a pull ring snap ear 44 is also provided at the end of the base 4; a pull ring pivot 51 snapped in the pull ring snap ear 44 is provided at the bottom of the pull ring 5; a brake piece drive pin 54 is also provided at the bottom of the pull ring 5; a brake piece pull ear 62 snapped onto the brake piece drive pin 54 is arranged at one end of the brake piece 6.

A stop salient point 46 is provided at one end of the base 4, and stop salient points 53 are provided at the two sides of the top of the pull ring 5; when the pull ring 5 is snapped into the base 4, the stop salient points 46 and 53 play a role of stopping and locating. A pull ring handle 52 is also provided at the top of the pull ring 5 for easy pull-out of the pull ring 5.

Figure 13:
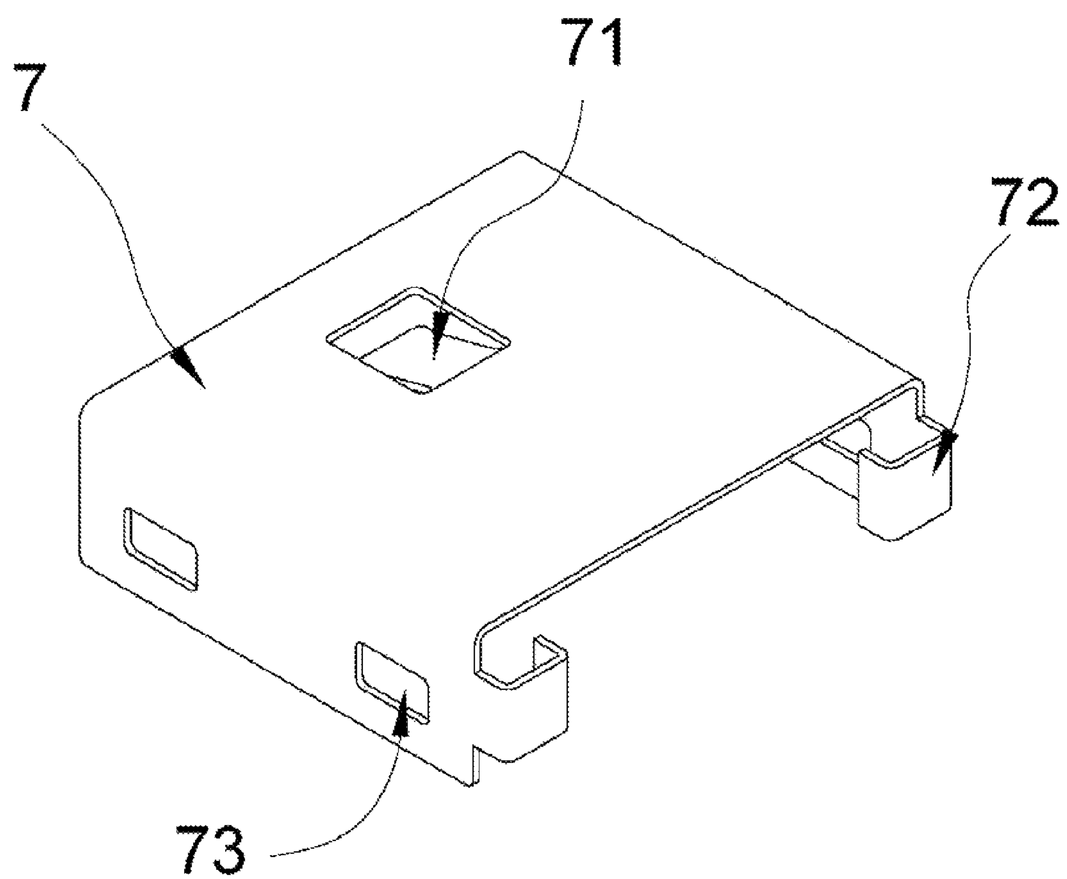
FIG. 13 is a skeleton diagram of the snap-in cover of the invention.

FIG. 13 shows a skeleton diagram of the snap-in cover of the invention. A snap-in cover 7 is provided at the bottom of the base 4; the snap-in cover 7 presses the brake piece 6 and is fastened to the bottom of the base 4. In the embodiment, two snap-in bosses 410 for the snap-in cover are respectively arranged at the two sides of the base 4; snap-in square holes 73 matching with the snap-in bosses are provided at the two sides of the snap-in cover 7; the snap-in square holes 73 are fastened to the snap-in bosses 410.

A brake piece sliding chamber 45 is also provided at the bottom of the base 4; a clip 71 is also provided at the bottom of the snap-in cover 7; the brake piece 6 is pressed by the clip 71 in the brake piece sliding chamber 45. Two ring stops 72 are arranged at one end of the snap-in cover to prevent the pull ring pivot 51 from sliding out of the pull ring snap ear 44.

The invention comes in simple structure for easy mounting and flexible detachment. In the course of production of the module, it only needs to mount the components of the PCB1 and RJ45 connector 3 into the base 4, and place the brake piece 6 and the pull ring 5 into the pull ring snap ear 44 of the base 4, and put on the outer cover 2 and the snap-in cover 7, which reduces the steps of assembling clip and fastening screws of the prior art, and improves productivity.

The forgoing description just shows the preferred embodiment of the present invention and is not intended to limit the protection scope of the present invention. Any equivalent replacements or improvements made by those skilled in the art within the spirit and principle of the invention shall fall within the scope of protection of the invention. The scope of protection of the present invention shall follow the claims.

The invention claimed is:

1. An electric-port SFP photoelectric module, comprising a base, an outer cover, a PCB and an RJ45 connector, characterized in that, the base is a rectangular parallelepiped provided with an inner cavity, the PCB and the RJ45 connector are connected in a combined manner, and the combined structure of the PCB and the RJ45 connector is arranged in the inner cavity of the base, and the upper part of the base is fastened with the outer cover, wherein a pull ring is also provided at one end of the base, and a brake piece is connected to the pull ring, which is fastened to the end of the base, wherein a pull ring snap ear is also provided at one end of the base, and a pull ring pivot snapped in the pull ring snap ear is coupled to the pull ring, wherein a brake piece drive pin is coupled to the pull ring, and a brake piece pull ear snapped onto the brake piece drive pin is provided at one end of the brake piece.

2. An electric-port SFP photoelectric module according to claim 1, characterized in that, the outer cover is an U-shaped cover, snap-in square holes are provided at the two sides of the outer cover, and snap-in bosses for the outer cover are provided at two side walls of the base, and the snap-in bosses for the outer cover is fastened with the snap-in square holes.

3. An electric-port SFP photoelectric module according to claim 2, characterized in that, a locator is also provided in the base, a locating notch matching with the locator is provided on the PCB, and the locating notch is snapped onto the locator.

4. An electric-port SFP photoelectric module according to claim 3, characterized in that, a PCB limit piece is also provided on the side wall of the outer cover, which locates the PCB.

5. An electric-port SFP photoelectric module, comprising a base, an outer cover, a PCB and an RJ45 connector, characterized in that, the base is a rectangular parallelepiped provided with an inner cavity, the PCB and the RJ45 connector are connected in a combined manner, and the combined structure of the PCB and the RJ45 connector is arranged in the inner cavity of the base, and the upper part of the base is fastened with the outer cover, wherein a pull ring is also provided at one end of the base, and a brake piece is connected to the pull ring, which is fastened to the end of the base, wherein a snap-in cover is provided at a bottom portion of the base, the snap-in cover presses the brake piece and is fastened to the bottom of the base.

6. An electric-port SFP photoelectric module according to claim 5, characterized in that, the outer cover is an U-shaped cover, snap-in square holes are provided at the two sides of the outer cover, and snap-in bosses for the outer cover are provided at two side walls of the base, and the snap-in bosses for the outer cover is fastened with the snap-in square holes.

7. An electric-port SFP photoelectric module according to claim 6, characterized in that, a locator is also provided in the base, a locating notch matching with the locator is provided on the PCB, and the locating notch is snapped onto the locator.

8. An electric-port SFP photoelectric module according to claim 7, characterized in that, a PCB limit piece is also provided on the side wall of the outer cover, which locates the PCB.

9. An electric-port SFP photoelectric module, comprising a base, an outer cover, a PCB and an RJ45 connector, characterized in that, the base is a rectangular parallelepiped provided with an inner cavity, the PCB and the RJ45 connector are connected in a combined manner, and the combined structure of the PCB and the RJ45 connector is arranged in the inner cavity of the base, and the upper part of the base is fastened with the outer cover, wherein a pull ring is also provided at one end of the base, and a brake piece is connected to the pull ring, which is fastened to the end of the base, wherein a snap-in cover is provided at a bottom portion of the base, the snap-in cover presses the brake piece and is fastened to the bottom of the base, wherein snap-in bosses for the snap-in cover are provided at the two sides of the base, snap-in square holes are provided at two side walls of the snap-in cover, and the snap-in square holes are fastened with the snap-in bosses.

10. An electric-port SFP photoelectric module according to claim 9, characterized in that, a clip is provided at a bottom portion of the snap-in cover, and the clip presses the said brake piece.

11. An electric-port SFP photoelectric module according to claim 9, characterized in that, the outer cover is an U-shaped cover, snap-in square holes are provided at the two sides of the outer cover, and snap-in bosses for the outer cover are provided at two side walls of the base, and the snap-in bosses for the outer cover is fastened with the snap-in square holes.

12. An electric-port SFP photoelectric module according to claim 11, characterized in that, a locator is also provided in the base, a locating notch matching with the locator is provided on the PCB, and the locating notch is snapped onto the locator.

13. An electric-port SFP photoelectric module according to claim 12, characterized in that, a PCB limit piece is also provided on the side wall of the outer cover, which locates the PCB.

* * * * *